(12) United States Patent
Mukojima (10) Patent No.: US 11,774,067 B2
(45) Date of Patent: Oct. 3, 2023

(54) LENS AND LAMP

(71) Applicant: KOITO MANUFACTURING CO., LTD., Tokyo (JP)

(72) Inventor: Kenta Mukojima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/669,735

(22) Filed: Feb. 11, 2022

(65) Prior Publication Data

US 2022/0163189 A1    May 26, 2022

Related U.S. Application Data

(63) Continuation of application No. PCT/JP2020/031646, filed on Aug. 21, 2020.

(30) Foreign Application Priority Data

Aug. 26, 2019   (JP) ................. 2019-153852

(51) Int. Cl.
| | |
|---|---|
| F21V 13/06 | (2006.01) |
| F21S 41/675 | (2018.01) |
| F21V 5/04 | (2006.01) |
| F21V 14/04 | (2006.01) |

(52) U.S. Cl.
CPC ............ *F21V 13/06* (2013.01); *F21S 41/675* (2018.01); *F21V 5/04* (2013.01); *F21V 14/04* (2013.01)

(58) Field of Classification Search
CPC ...... F21S 41/663; F21S 41/635; F21S 41/675; F21V 5/04; F21V 5/045; F21V 5/048
See application file for complete search history.

(56) References Cited

U.S. PATENT DOCUMENTS

| | | |
|---|---|---|
| 2008/0247188 A1 | 10/2008 | Woodward |
| 2018/0106447 A1 | 4/2018 | Tanaka et al. |

FOREIGN PATENT DOCUMENTS

| | | | |
|---|---|---|---|
| CN | 104100909 A | * 10/2014 | ............ F21S 41/675 |
| EP | 1686313 A2 | 8/2006 | |
| EP | 3869088 A1 | 8/2021 | |
| JP | 2015115165 A | 6/2015 | |
| JP | 2018067523 A | 4/2018 | |

(Continued)

OTHER PUBLICATIONS

Extended European Search Report issued in EP Application No. 20858402.9; dated Sep. 6, 2022; 7 pages.

(Continued)

*Primary Examiner* — Mariceli Santiago
(74) *Attorney, Agent, or Firm* — BUCHANAN INGERSOLL & ROONEY PC (57) ABSTRACT

A condenser lens includes an exit surface divided into a plurality of light controlling surfaces. The exit surface includes a first exit region and a second exit region. The first exit region includes a plurality of first light controlling surfaces arrayed in a predetermined direction. The second exit region is located side by side with the first exit region and includes a plurality of second light controlling surfaces arrayed in the predetermined direction. A border between adjacent first light controlling surfaces and a border between adjacent second light controlling surfaces are out of alignment in the predetermined direction.

4 Claims, 12 Drawing Sheets

(56) References Cited

FOREIGN PATENT DOCUMENTS

| KR | 20190081690 A | 7/2019 | |
|---|---|---|---|
| WO | 2018166911 A1 | 9/2018 | |
| WO | 2018212010 A1 | 11/2018 | |
| WO | WO-2020137636 A1 * | 7/2020 | ............ F21S 41/143 |

OTHER PUBLICATIONS

International Search Report (PCT/ISA/210) with translation dated Oct. 13, 2020, by the Japan Patent Office as the International Searching Authority for International Application No. PCT/JP2020/031646. (4 Pages).

International Preliminary Report on Patentability (Form PCT/IB/373) and Written Opinion (PCT/ISA/237) with translation dated Mar. 1, 2022, by the Japan Patent Office as the International Searching Authority for International Application No. PCT/JP2020/031646. (8 Pages).

* cited by examiner

LENS AND LAMP

BACKGROUND

1. Technical Field

The present invention relates to lenses.

2. Description of the Related Art

In one device devised in recent years, light emitted from a light source is reflected toward a space in front of a vehicle, and this reflected light scans a region in front of the vehicle to form a predetermined light distribution pattern. For example, there is known an optical unit that includes a light source constituted by a light emitting element and a rotary reflector that rotates in one direction about an axis of rotation while reflecting light emitted from the light source. The rotary reflector is provided with a reflective surface such that the light emitted from the light source and reflected by the rotating rotary reflector forms a desired light distribution pattern (see patent document 1).

This optical unit includes a first light source, a second light source, a rotary reflector that rotates about an axis of rotation while reflecting first light emitted from the first light source, and a projection lens that projects the first light reflected by the rotary reflector into a light illuminating direction of the optical unit. The second light source is disposed such that second light emitted from the second light source enters the projection lens without being reflected by the rotary reflector, and the projection lens projects the second light into the light illuminating direction of the optical unit.

patent document 1: JP2018-67523

The first light source included in the optical unit described above includes a plurality of light emitting modules disposed in an array, and a condenser lens including a plurality of lens portions that correspond to the respective light emitting surfaces of the light emitting modules is disposed so as to face the light emitting surfaces. A condensed light distribution pattern formed by the optical unit described above corresponds to the pattern of the light emitting surface (light exit surface) of the condenser lens. Therefore, in order to expand the illumination region, the condenser lens needs to have a larger light emitting surface. Moreover, a light distribution pattern may become partially uneven depending on the shape of the light emitting surface of the condenser lens.

SUMMARY

The present invention has been made in view of such circumstances, and one exemplary object thereof is to provide a novel optical member that can achieve a high-quality light distribution pattern.

In addressing the above problem, a lens according to one aspect of the present invention is for use in a lamp, and this lens includes an exit surface divided into a plurality of light controlling surfaces. The exit surface includes a first exit region in which a plurality of first light controlling surfaces of the plurality of light controlling surfaces are arrayed in a predetermined direction, and a second exit region that is located side by side with the first exit region and in which a plurality of second light controlling surfaces of the plurality of light controlling surfaces are arrayed in the predetermined direction. The lens is configured such that a border between adjacent two of the first light controlling surfaces and a border between adjacent two of the second light controlling surfaces are out of alignment in the predetermined direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

In addressing the above problem, a lens according to one aspect of the present invention is for use in a lamp, and this lens includes an exit surface divided into a plurality of light controlling surfaces. The exit surface includes a first exit region in which a plurality of first light controlling surfaces of the plurality of light controlling surfaces are arrayed in a predetermined direction, and a second exit region that is located side by side with the first exit region and in which a plurality of second light controlling surfaces of the plurality of light controlling surfaces are arrayed in the predetermined direction. The lens is configured such that a border between adjacent two of the first light controlling surfaces and a border between adjacent two of the second light controlling surfaces are out of alignment in the predetermined direction.

According to this aspect, a border between adjacent first light controlling surfaces and a border between adjacent second light controlling surfaces are not aligned either continuously or linearly. Accordingly, even if a dim portion (optical unevenness) is produced in an image of a luminous region due to the shape of a border between adjacent light controlling surfaces, no one dim portion traverses continuously from one end to the other end of the image.

A lamp may include a light emitting element, a lens that receives light emitted from the light emitting element, and a rotary reflector that rotates about an axis of rotation while reflecting light transmitted through the lens. The rotary reflector may reflect and scan a luminous pattern of the first exit region and the second exit region to form at least a part of a light distribution pattern. Thus, a streaked dim portion that may arise in a light distribution pattern can be reduced.

The rotary reflector may be configured to scan the luminous pattern in a direction intersecting the predetermined direction in which the first light controlling surfaces and the second light controlling surfaces are arrayed.

At least one of the plurality of light controlling surfaces may be a third light controlling surface located in front of a light emitting surface of the corresponding light emitting element, and the third light controlling surface may be adjacent to both the first light controlling surfaces and the second light controlling surfaces. This configuration can make unevenness in a light distribution pattern less noticeable even when the first light controlling surfaces and/or the second light controlling surfaces, aside from the third light controlling surface located in front of the light emitting surface of the light emitting element, are provided to expand the illumination region.

The first light controlling surfaces and the second light controlling surfaces may be configured to expand a luminous region of the lens by directing light emitted diagonally from the light emitting surface to the lens and causing the light to exit toward the front. This configuration can make unevenness in a light distribution pattern less noticeable even when the first light controlling surfaces and/or the second light controlling surfaces having discontinuous concavities and convexities formed in their surfaces are provided to expand the illumination region.

Any optional combination of the above constituent elements or an embodiment obtained by converting what is expressed by the present invention among a method, an apparatus, a system, and so on is also valid as an embodiment of the present invention.

Hereinafter, the present invention will be described on the basis of some embodiments with reference to the drawings. Identical or equivalent constituent elements, members, and processes illustrated in the drawings are given identical reference characters, and duplicate descriptions thereof will be omitted, as appropriate. The embodiments are illustrative in nature and are not intended to limit the invention. Not all the features and combinations thereof described according to the embodiments are necessarily essential to the invention.

An optical unit that includes a lens unit according to an embodiment can be used in various vehicle lamps. First, an overview of a vehicle headlamp to which an optical unit according to an embodiment described below can be mounted will be given.

(Vehicle Headlamp)

Figure 1:
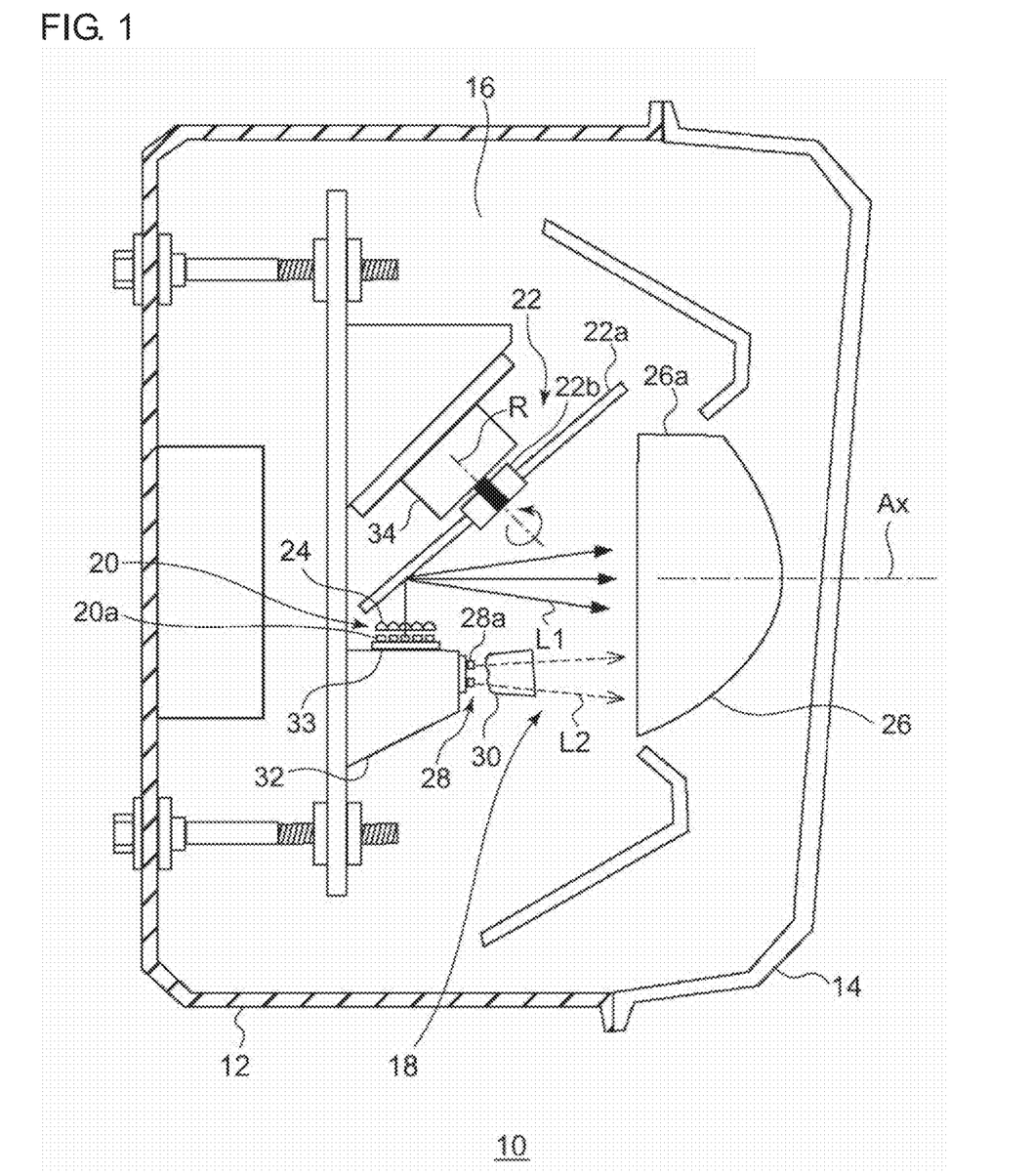
FIG. 1 is a schematic horizontal sectional view of a vehicle headlamp according to an embodiment.
Figure 2:
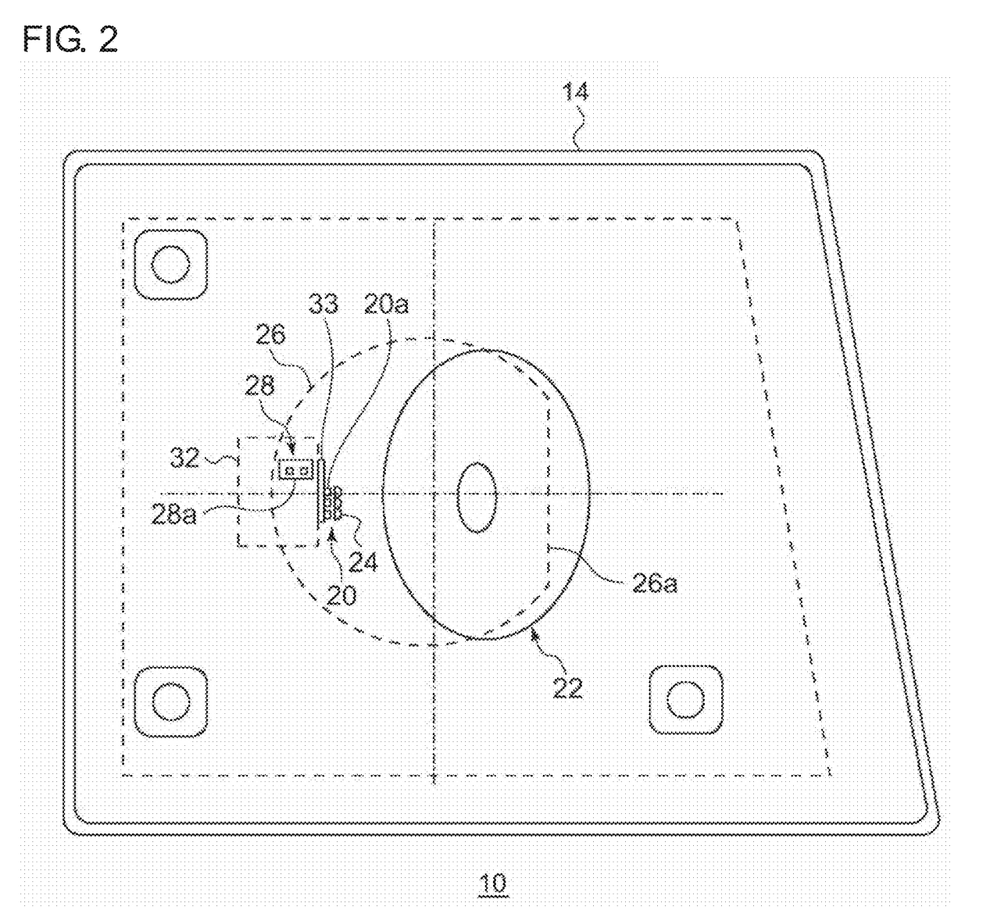
FIG. 2 is a front view of a vehicle headlamp according to an embodiment.

FIG. 1 is a schematic horizontal sectional view of a vehicle headlamp according to the present embodiment. FIG. 2 is a front view of the vehicle headlamp according to the present embodiment. FIG. 2 omits some of the components.

A vehicle headlamp 10 according to the present embodiment is a right-side headlamp to be mounted in a front right part of an automobile and has a structure identical to the structure of a headlamp to be mounted in the left side except that these headlamps are horizontally symmetric. Therefore, the right-side vehicle headlamp 10 will be described below in detail, and the description of the left-side vehicle headlamp will be omitted.

As illustrated in FIG. 1, the vehicle headlamp 10 includes a lamp body 12 having a concave portion that opens out to the front side of the vehicle headlamp 10. The front opening of the lamp body 12 is covered by a transparent front cover 14 to form a lamp room 16. The lamp room 16 functions as a space that houses one optical unit 18. The optical unit 18 is a lamp unit configured to be capable of emitting a variable high beam. A variable high beam refers to a high beam that has been so controlled as to change the shape of a high-beam light distribution pattern. For example, the variable high beam can produce a non-illumination region (shaded portion) in a portion of a light distribution pattern. In this example, a light distribution pattern corresponds to an illumination region that a lamp forms on a screen (virtual screen) placed twenty-five meters to fifty meters in front of the lamp.

The optical unit 18 includes a first light source 20, a condenser lens 24, a rotary reflector 22, a convex lens 26, a second light source 28, a diffuser lens 30, and a heat sink 32. The condenser lens 24 serves as a primary optical system (optical member) that changes an optical path of first light L1 emitted from the first light source 20 to direct the first light L1 toward blades 22*a* of the rotary reflector 22. The rotary reflector 22 rotates about an axis of rotation R while reflecting the first light L1. The convex lens 26 serves as a projection lens that projects the first light L1 reflected by the rotary reflector 22 into a light illuminating direction (the right direction in FIG. 1) of the optical unit. The second light source 28 is disposed between the first light source 20 and the convex lens 26. The diffuser lens 30 serves as a primary optical system (optical member) that changes an optical path of second light L2 emitted from the second light source 28 to direct the second light L2 toward the convex lens 26. The heat sink 32 has the first light source 20 and the second light source 28 mounted thereon.

A semiconductor light emitting element, such as an LED, an EL, or an LD, is used for each light source. The first light source 20 according to the present embodiment includes a plurality of LEDs 20*a* disposed in an array on a circuit board 33. LEDs 20*a* can be turned on or off independently of each other.

The second light source 28 according to the present embodiment includes two LEDs 28*a* disposed side by side in an array in the horizontal direction. LEDs 28*a* can be turned on or off independently of each other. The second light source 28 is disposed such that the second light L2 enters the convex lens 26 without being reflected by the rotary reflector 22. With this configuration, the optical characteristics of the second light source 28 can be selected without taking into consideration that the second light L2 emitted from the second light source 28 could be reflected by the rotary reflector 22. Therefore, for example, when the light emitted from the second light source 28 is made to enter the convex lens 26 after being diffused by the diffuser lens 30, the resulting light can illuminate a greater range.

Hence, the second light source 28 can be used as a light source for illuminating outward regions of the vehicle.

The rotary reflector 22 rotates by a driving source, such as a motor 34, and rotates in one direction about the axis of rotation R. The rotary reflector 22 includes two blades 22a having an identical shape, and the blades 22a are provided on a periphery of a tubular rotary portion 22b. The blades 22a function as a reflective surface configured to reflect the light emitted from the first light source 20 while rotating and to scan a space in front of the vehicle with the reflected light so as to form a desired light distribution pattern.

The axis of rotation R of the rotary reflector 22 is inclined relative to an optical axis Ax and lies within a plane that includes the optical axis Ax and the first light source 20. In other words, the axis of rotation R extends substantially parallel to a scanning plane of the light (illumination beams) from the LEDs 20a that scans in the right-left direction as the rotary reflector 22 rotates. This configuration can reduce the thickness of the optical unit. In this example, the scanning plane can be regarded, for example, as a fan-shaped plane formed by continuously connecting trajectories of the light, serving as the scanning light, emitted from the LEDs 20a.

The shape of the convex lens 26 can be selected as appropriate in accordance with the required light distribution characteristics, such as the required light distribution pattern or the required luminous intensity distribution. An aspherical lens or a free-form surface lens can be used as the convex lens 26. For example, when each light source and the rotary reflector 22 are arranged in a certain way, the convex lens 26 according to the present embodiment can have a cut-out portion 26a where a part of the outer periphery of the convex lens 26 is cut out in the vertical direction. Then, the size of the optical unit 18 in the widthwise direction of the vehicle can be reduced.

In addition, the presence of the cut-out portion 26a makes the blades 22a of the rotary reflector 22 less likely to interfere with the convex lens 26, and the distance between the convex lens 26 and the rotary reflector 22 can be reduced. The presence of a non-circular (i.e., linear) portion formed in the outer periphery of the convex lens 26 when the vehicle headlamp 10 is viewed into its front side can help achieve a vehicle headlamp having an innovative design that is provided with a lens having an outline consisting of a combination of a curved line and a straight line as viewed into the front of the vehicle.

(First Light Source)

Figure 3:
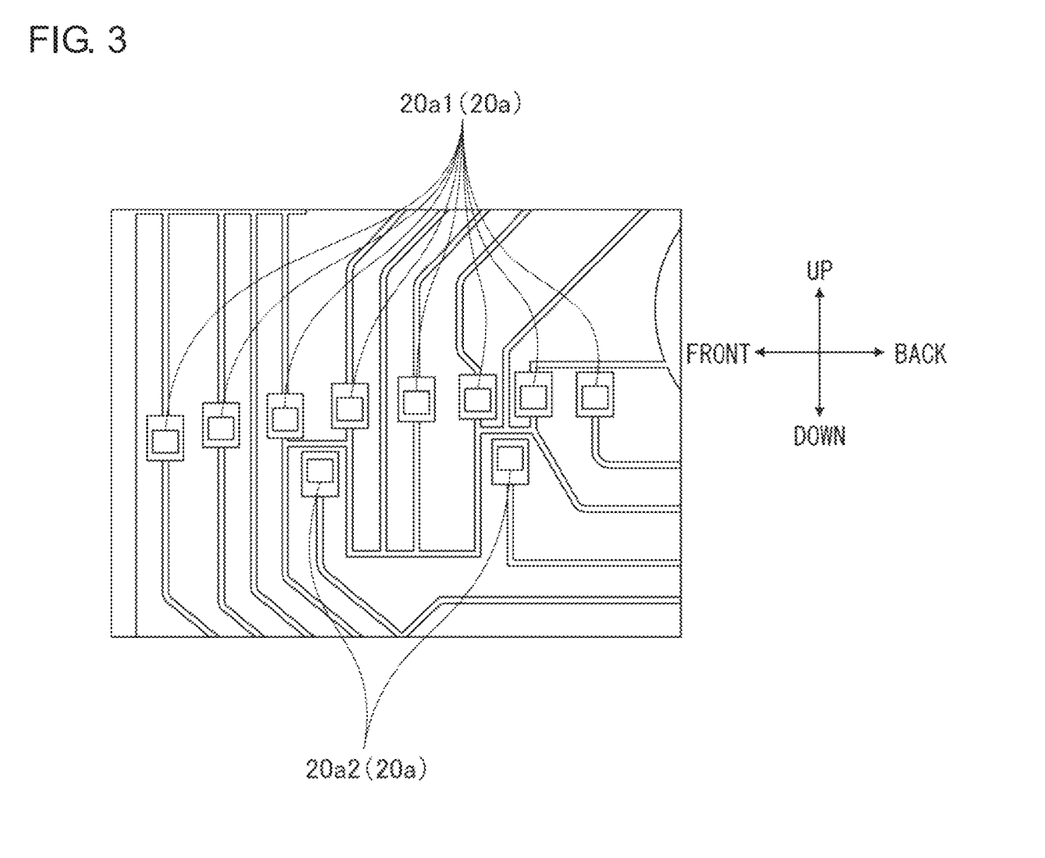
FIG. 3 is a top view of a circuit board according to an embodiment.

Next, a layout of a plurality of semiconductor light emitting elements included in a first light source will be described. FIG. 3 is a top view of a circuit board according to the present embodiment. The circuit board 33 according to the present embodiment has mounted thereon eight LEDs 20a1 (20a) that illuminate a region including the H-H line of a high-beam light distribution pattern and two LEDs 20a2 (20a) that illuminate a region above the H-H line. The up, down, front, and back directions indicated in FIG. 3 are defined with the direction of the optical axis Ax of the vehicle headlamp 10 regarded as the front direction.

(Optical Member)

Figure 4:
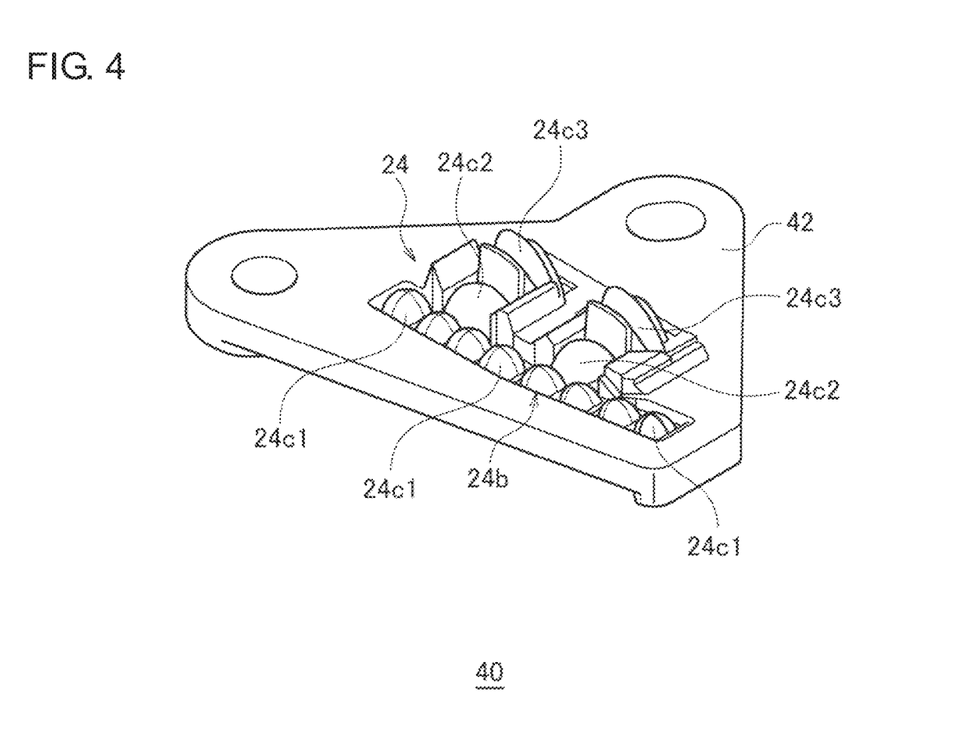
FIG. 4 is a perspective view of an optical member according to an embodiment.
Figure 5:
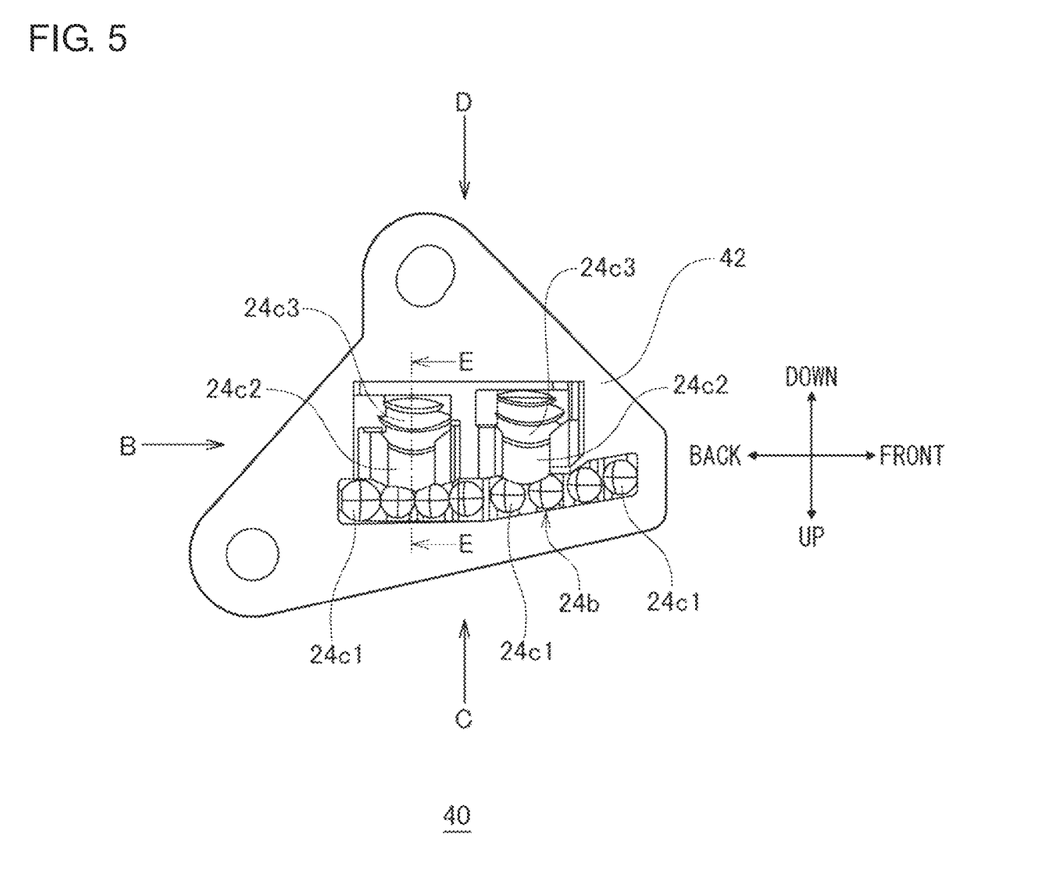
FIG. 5 is a front view of an optical member according to an embodiment.
Figure 6:
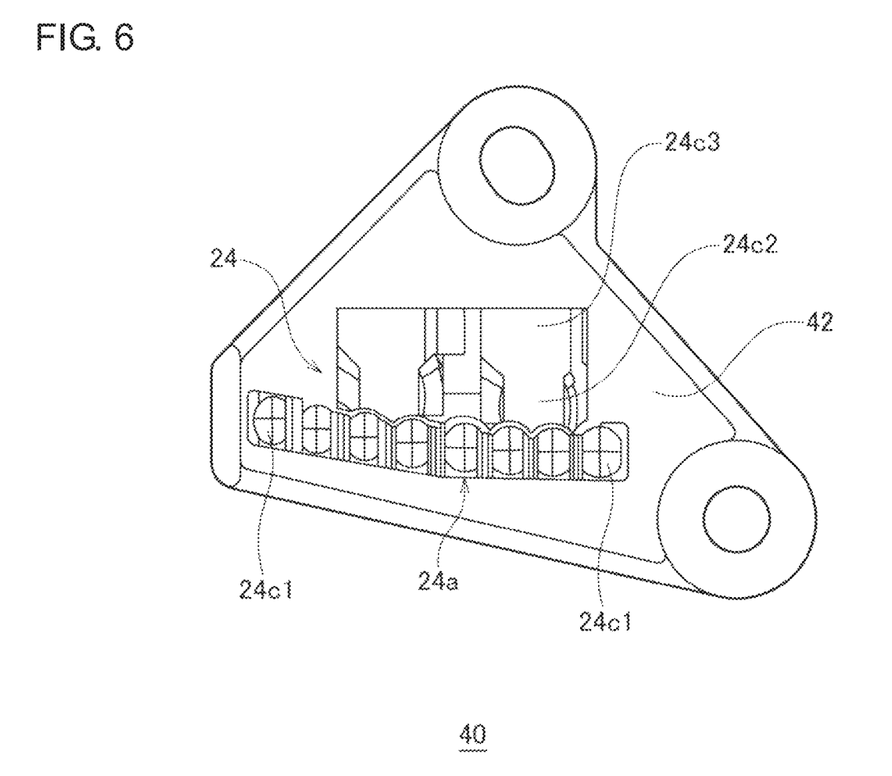
FIG. 6 is a rear view of an optical member according to an embodiment.
Figure 7:
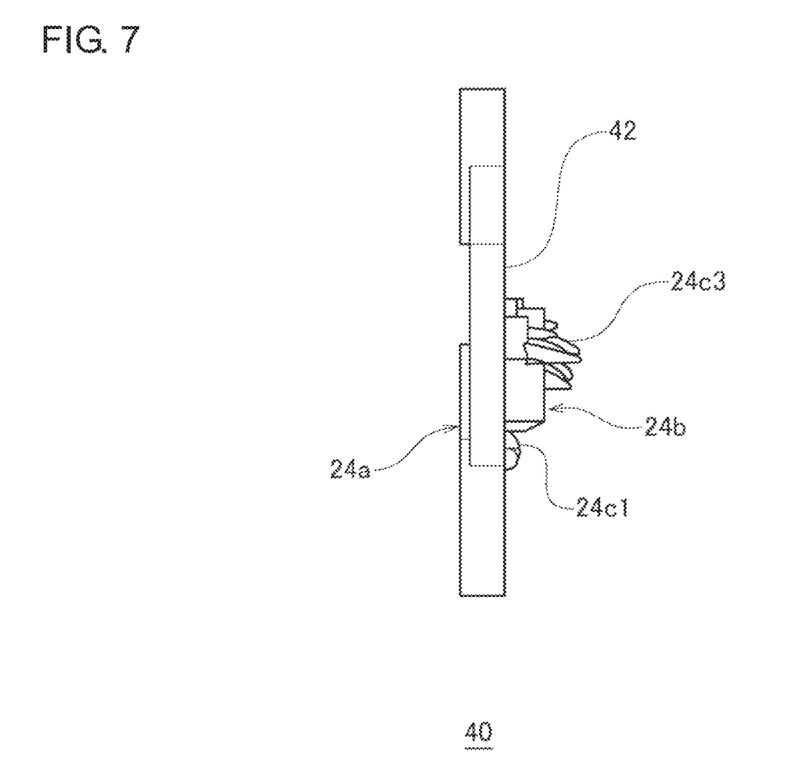
FIG. 7 is a side view of the optical member illustrated in FIG. 5, as viewed in the direction of B.
Figure 8A:
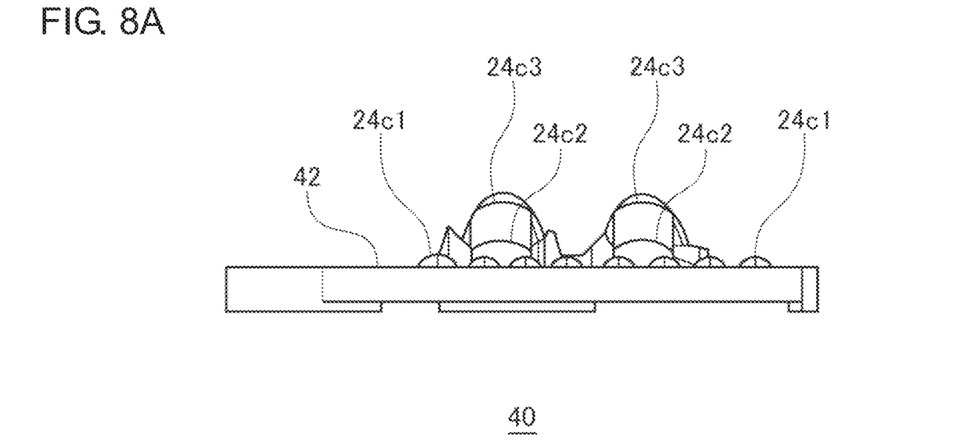
FIG. 8A is a side view of the optical member illustrated in FIG. 5, as viewed in the direction of C.
Figure 8B:
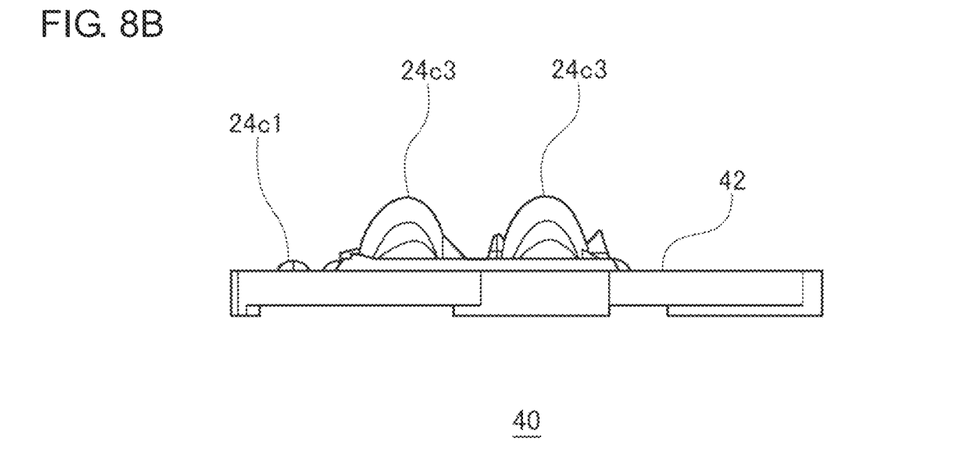
FIG. 8B is a side view of the optical member illustrated in FIG. 5, as viewed in the direction of D.

Next, an optical member will be described. FIG. 4 is a perspective view of the optical member. FIG. 5 is a front view of the optical member. FIG. 6 is a rear view of the optical member. FIG. 7 is a side view of the optical member illustrated in FIG. 5, as viewed in the direction of B. FIG. 8A is a side view of the optical member illustrated in FIG. 5, as viewed in the direction of C; and FIG. 8B is a side view of the optical member illustrated in FIG. 5, as viewed in the direction of D. The up, down, front, and back directions indicated in FIG. 5 are defined with the direction of the optical axis Ax of the vehicle headlamp 10 regarded as the front direction.

An optical member 40 includes a condenser lens 24 and a plate-like base portion 42. The condenser lens 24 serves as an optical controller that controls the light that enters the optical member 40 via a back side 24a to cause the light to exit via a front side 24b. The base portion 42 is adjacent to the condenser lens 24. The condenser lens 24 includes eight lens portions 24c1 corresponding to the respective lights emitted from the eight LEDs 20a1 and two lens portions 24c2 corresponding to the respective lights emitted from the two LEDs 20a2. In this example, to control light means to direct the light in a desired pattern, direction, or region, for example.

The gap between the light emitting surface of the LEDs 20a and the entry surface of the condenser lens 24 according to the present embodiment is about 0.2 mm to about 1 mm or preferably about 0.2 mm to about 0.5 mm. The thickness of the base portion 42 is about 1 mm to about 5 mm or preferably about 2 mm to about 3 mm. The diameter of each dome-shaped lens portion 24c2 is about 2 mm to about 4 mm.

The lens portions 24c1 and 24c2 of the optical member 40 are each shaped to condense the light transmitted therethrough by refracting the light. The lens portions 24c1 are each convex at its back side 24a as well as at its front side 24b. The lens portions 24c2 each include an expanding lens portion 24c3, which will be described later. In the optical controller, for example, a surface region of the front side 24b through which the light emitted from the LEDs 20a is transmitted to exit the optical controller functions as a light emitting surface of a pseudo-light source.

The optical member 40 is an injection-molded component formed of a transparent material and can be formed of, for example but not limited to, heat-resistant silicone, acryl, polycarbonate, or glass. Preferably, heat-resistant silicone (can resist the heat of 180° C. or higher) or glass is used, from the standpoint of its heat-resistant property. From the standpoint of the design flexibility in terms of the shape of the optical member, heat-resistant silicone is more preferable as it can be forcibly removed from a mold relatively easily. Thus, even when the optical member has a somewhat complex shape, the optical member can be manufactured with a simple mold configuration or through a simple manufacturing method.

(Expanding Lens Portion)

Figure 9:
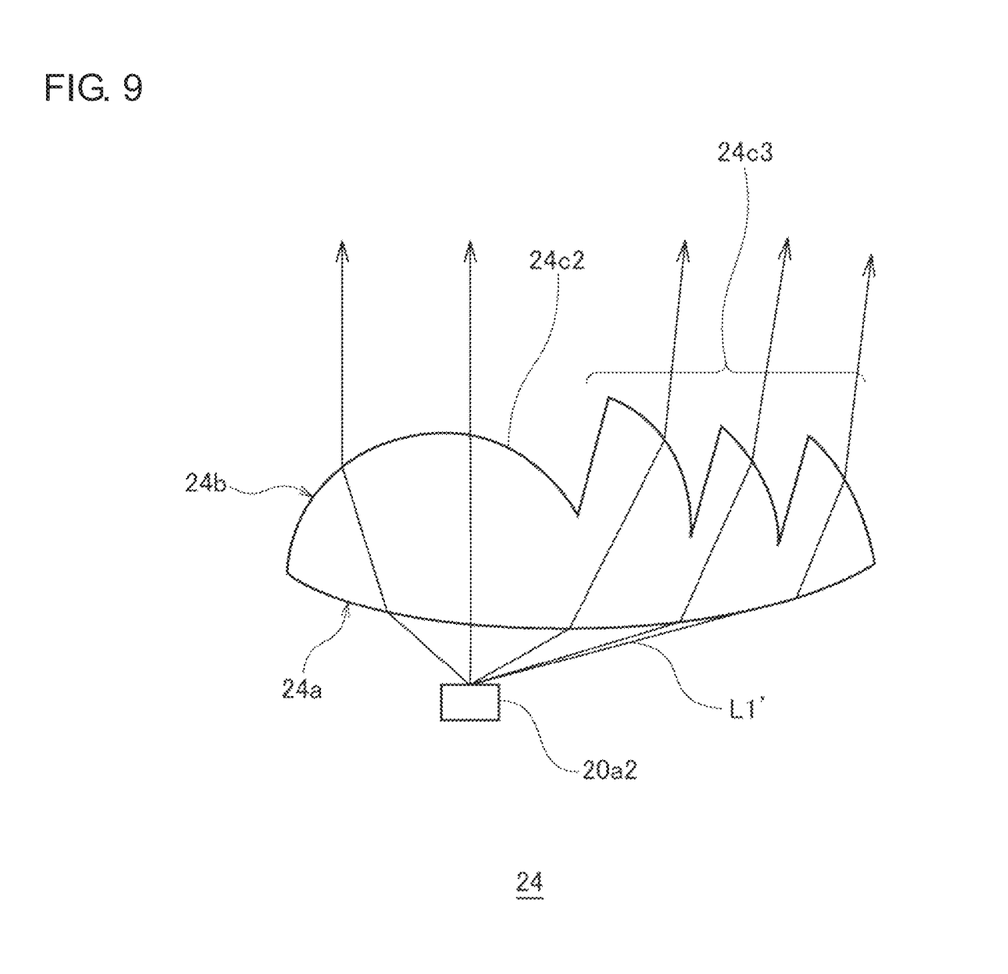
FIG. 9 is a sectional view of the optical member illustrated in FIG. 5, taken along the E-E line.

FIG. 9 is a sectional view of the optical member illustrated in FIG. 5, taken along the E-E line. The optical unit 18 includes the first light source 20, the optical member 40, and the convex lens 26. The plurality of LEDs 20a1 and 20a2 are disposed in an array in the first light source 20. The optical member 40 includes the plurality of lens portions 24c1 and 24c2 corresponding to the respective LEDs 20a1 and 20a2 and condenses the light emitted from the first light source 20. The convex lens 26 projects the light transmitted through the optical member 40 into the light illuminating direction of the optical unit to form a light distribution pattern.

At least one of the plurality of lenses included in the optical member 40 includes the condensing lens portion 24c2 and the expanding lens portion 24c3. The condensing lens portion 24c2 is located in front of the light emitting surface of the corresponding LED 20a2. The expanding lens portion 24c3 receives light L1' emitted diagonally from the light emitting surface of the corresponding LED 20a2 and causes the light L1' to travel in the front direction of the lens so as to expand a luminous region of the lens. As illustrated in FIG. 9, the expanding lens portion 24c3 is formed into a Fresnel lens. This configuration can help reduce the thickness of the expanding lens portion 24c3. The expanding lens portion 24c3 formed into a Fresnel lens has a longitudinal dimension of 3 mm to 5 mm and a lateral dimension of 3 mm to 5 mm as viewed from the front and has a height of about 3 mm to about 5 mm as viewed from the side.

(Light Distribution Pattern)

Figure 10A:
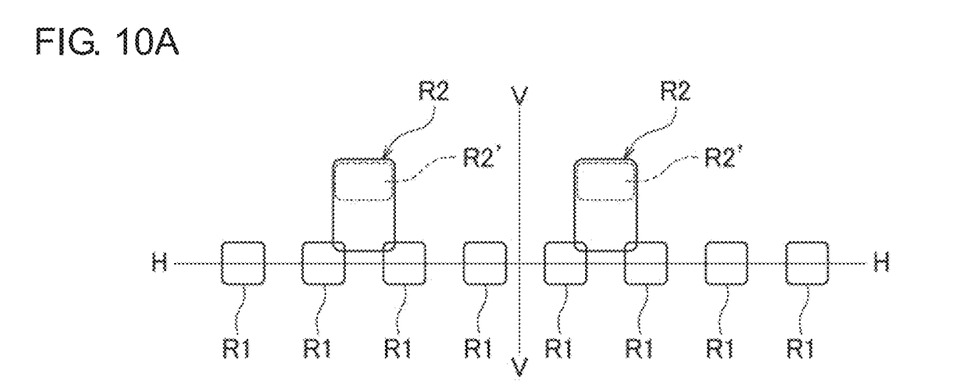
FIG. 10A is a schematic diagram illustrating an illumination range obtained when a luminous region of a first light source according to an embodiment is reflected and projected by a stationary rotary reflector.
Figure 10B:
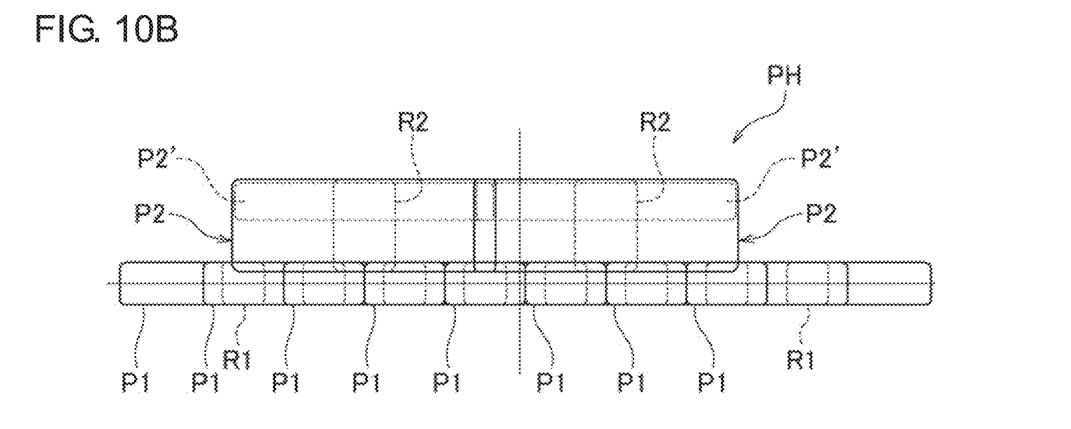
FIG. 10B is a schematic diagram of a light distribution pattern formed by an optical unit according to an embodiment.

FIG. 10A is a schematic diagram illustrating an illumination range obtained when a luminous region of a first light source according to the present embodiment is reflected and projected by a stationary rotary reflector; and FIG. 10B is a schematic diagram of a light distribution pattern formed by an optical unit.

In the optical unit 18, when all the LEDs 20a of the first light source 20 are turned on with the rotary reflector 22 kept from rotating, the surfaces of the eight lens portions 24c1 and the two lens portions 24c2 of the condenser lens 24 serve as a luminous region. Then, the surface of the stationary rotary reflector 22 reflects an image of the luminous region, and this image is projected into a space in front of the vehicle via the convex lens 26 (see FIG. 10A).

In the optical unit 18, the eight lights that have exited the condenser lens 24 via the respective lens portions 24c1 form eight rectangular illumination regions R1 on the H-H line. The two lights that have exited the condenser lens 24 via the respective lens portions 24c2 and the respective expanding lens portions 24c3 form two rectangular illumination regions R2 on the upper side of the illumination regions R1. The expanding lens portions 24c3 expand the luminous region of the lens portions 24c2 in the vertical direction, and therefore the illumination regions R2 are each a rectangular region that is longer in the vertical direction.

If the condenser lens 24 includes only the lens portions 24c2, the light can illuminate only a range of up to about +4 degrees in the vertical direction on the screen in front of the vehicle. In contrast, in the case of the condenser lens 24 that includes the expanding lens portions 24c3, the light can illuminate a range of up to about +6 degrees in the vertical direction on the screen in front of the vehicle. In this manner, the optical unit 18 can expand the illumination region since the luminous region of the lens portions 24c2 is expanded in the vertical direction by the expanding lens portions 24c3.

When the rotary reflector 22 rotates, the illumination regions R1 and R2 are scanned in the right-left direction and form the respective partial light distribution patterns P1 and P2. According to the present embodiment, a high-beam light distribution pattern PH is formed as the partial light distribution patterns P1 and P2 are superposed on each other.

In this manner, the rotary reflector 22 according to the present embodiment forms a part or the whole of the high-beam light distribution pattern PH by reflecting and scanning the pattern of the luminous region of the condenser lens 24.

The optical unit 18 forms upper regions P2' of the high-beam light distribution pattern PH by reflecting and scanning the patterns of the portions (regions R2'), of the luminous region of the condenser lens 24, that correspond to the expanding lens portions 24c3. This makes it possible to further expand the illumination region of the high-beam light distribution pattern PH in the vertical direction.

The optical member 40 is disposed such that a virtual image of the luminous region of the condenser lens 24 formed by the rotary reflector 22 is located at or around the focal point of the convex lens 26. Alternatively, the optical member 40 may be disposed such that the luminous region of the condenser lens 24 is located at or around the focal point of the convex lens 26. This configuration allows the luminous region of the condenser lens 24 to be projected as a light source into the front direction of the convex lens 26.

Reference Example

Figure 11A:
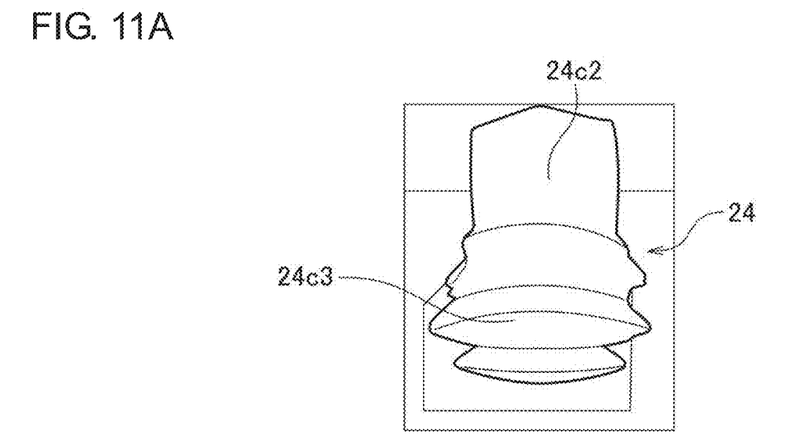
FIG. 11A is a top view of a condenser lens.
Figure 11B:
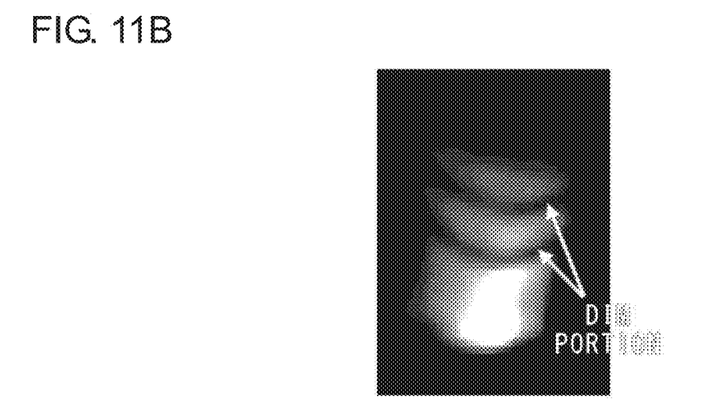
FIG. 11B is a schematic diagram illustrating a light distribution pattern obtained when a luminous region of the condenser lens is reflected and projected by a stationary rotary reflector.
Figure 11C:
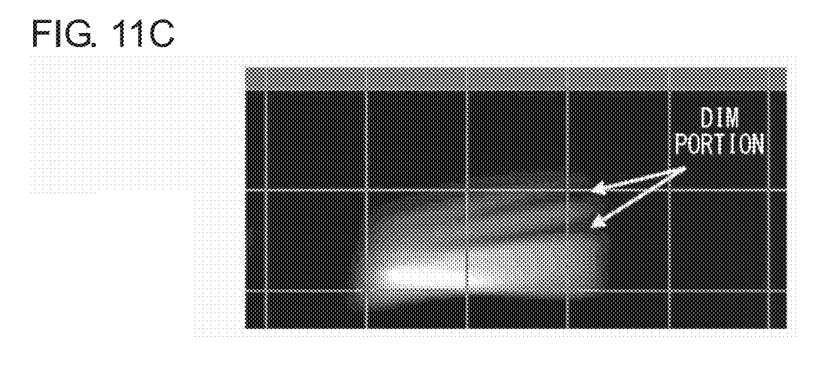
FIG. 11C is a schematic diagram of a light distribution pattern formed by an optical unit that includes the condenser lens.

FIG. 11A is a top view of the condenser lens 24, FIG. 11B is a schematic diagram illustrating a light distribution pattern obtained when a luminous region of the condenser lens 24 is reflected and projected by a stationary rotary reflector, and FIG. 11C is a schematic diagram of a light distribution pattern formed by an optical unit that includes the condenser lens 24.

As illustrated in FIG. 11A, the condenser lens 24 includes an expanding lens portion 24c3 that receives light L1' emitted diagonally from the light emitting surface of the corresponding LED 20a2 and causes the light L1' to travel in the front direction of the lens so as to expand the luminous region of the lens. However, this expanding lens portions 24c3 includes three light controlling surfaces formed into Fresnel lenses in order to reduce the thickness of the lens itself. Therefore, the exit surface of the expanding lens portion 24c3 is uneven, and there is a clear border between adjacent light controlling surfaces.

Therefore, as illustrated in FIG. 11B, a dim portion (optical unevenness) continuing from one end to the other end of an image is produced in a part of the image of the luminous region of the condenser lens 24. As a result, as illustrated in FIG. 11C, a streaked dim portion is produced also in the light distribution pattern obtained by scanning the image of the luminous region illustrated in FIG. 11B. Accordingly, further improvement is necessary from the standpoint of achieving a high-quality light distribution pattern.

Example

Figure 12A:
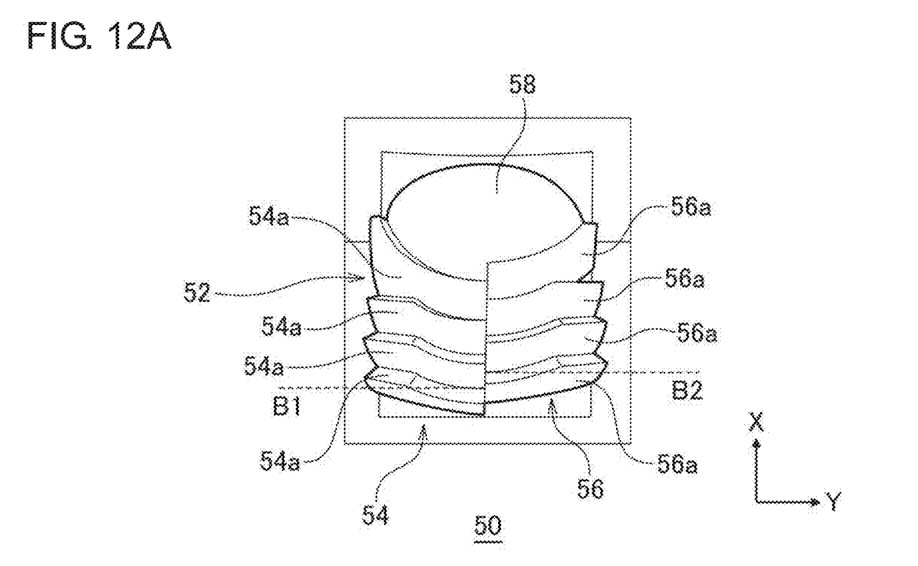
FIG. 12A is a top view of a condenser lens according to one example.
Figure 12B:
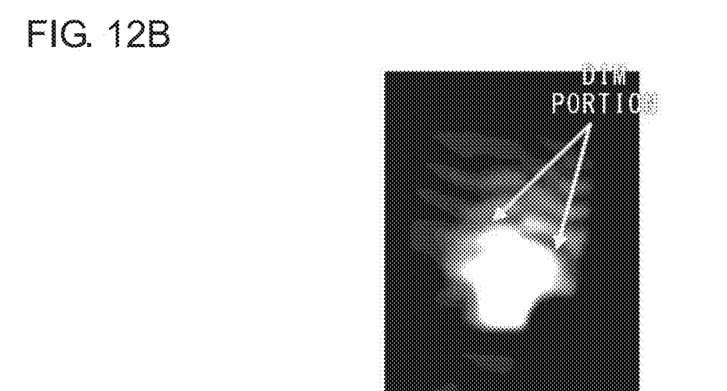
FIG. 12B is a schematic diagram illustrating a light distribution pattern obtained when a luminous region of the condenser lens is reflected and projected by a stationary rotary reflector.
Figure 12C:
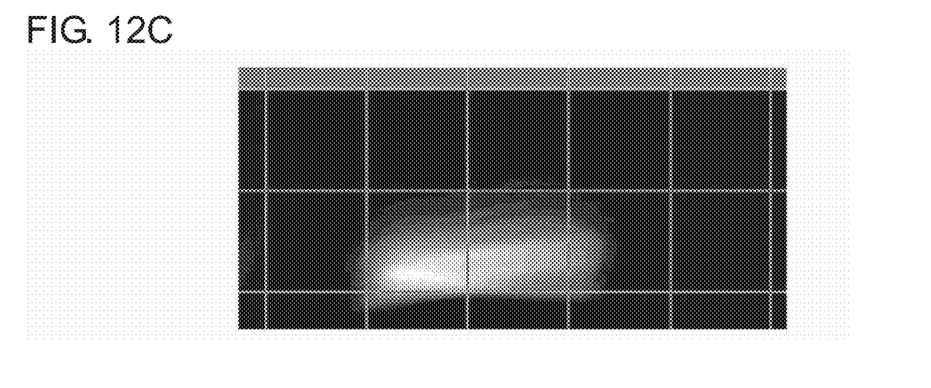
FIG. 12C is a schematic diagram of a light distribution pattern formed by an optical unit that includes the condenser lens.

FIG. 12A is a top view of a condenser lens 50 according to one example, FIG. 12B is a schematic diagram illustrating a light distribution pattern obtained when a luminous region of the condenser lens 50 is reflected and projected by a stationary rotary reflector, and FIG. 12C is a schematic diagram of a light distribution pattern formed by an optical unit that includes the condenser lens 50.

The condenser lens 50 according to the example includes an exit surface 52 divided into a plurality of light controlling surfaces. Specifically, the exit surface 52 includes a first exit region 54 and a second exit region 56. The first exit region 54 includes a plurality of first light controlling surfaces 54a arrayed in a predetermined direction X. The second exit region 56 is located side by side with the first exit region 54 and includes a plurality of second light controlling surfaces 56a arrayed in the predetermined direction X. A border B1 between adjacent first light controlling surfaces 54a and a border B2 between adjacent second light controlling surfaces 56a are out of alignment in the predetermined direction X.

With this configuration, a border B1 between adjacent first light controlling surfaces 54a and a border B2 between adjacent second light controlling surfaces 56a are not aligned either continuously or linearly. Accordingly, even if a dim portion (optical unevenness) is produced in an image of the luminous region as illustrated in FIG. 12B due to the shape of a border between adjacent light controlling surfaces (in particular, a discontinuous shape), no one dim portion traverses continuously from one end to the other end of the image.

A vehicle headlamp 10 according to the present example may include LEDs 20a, a condenser lens 50 that receives light emitted from the LEDs 20a, and a rotary reflector 22 that rotates about an axis of rotation while reflecting light transmitted through the condenser lens 50. The rotary reflector 22 reflects and scans luminous patterns of the first exit region 54 and the second exit region 56 to form at least a portion of a light distribution pattern. With this configuration, any streaked dim portion that may appear in a light distribution pattern (see FIG. 11C) can be reduced, as illustrated in FIG. 12C.

The rotary reflector 22 according to the present embodiment is preferably configured to scan a luminous pattern in a direction Y intersecting the predetermined direction X in which the first light controlling surfaces 54a and the second light controlling surfaces 56a illustrated in FIG. 12A are arrayed.

In the condenser lens 50 according to the example, at least one of the plurality of light controlling surfaces is a dome-shaped third light controlling surface 58 located in front of the light emitting surface of a corresponding LED 20a, and the third light controlling surface 58 is adjacent to both one of the first light controlling surfaces 54a and one of the second light controlling surfaces 56a. This configuration can make unevenness in a light distribution pattern less noticeable even when the first light controlling surfaces 54a and/or the second light controlling surfaces 56a, aside from the third light controlling surface 58 located in front of the light emitting surface of an LED 20a, are provided to expand the illumination region.

In the condenser lens 50 according to the present example, as with the expanding lens portions 24c3 described above, the first light controlling surfaces 54a and the second light controlling surfaces 56a are configured to expand the luminous region of a lens by directing the light emitted diagonally from the light emitting surface to enter the lens and causing the light to exit toward the front. This configuration can make unevenness in a light distribution pattern less noticeable even when the first light controlling surfaces 54a and/or the second light controlling surfaces 56a having discontinuous concavities and convexities formed in their surfaces are provided to expand the illumination region.

Thus far, the present invention has been described with reference to the foregoing embodiments. The present invention, however, is not limited to the foregoing embodiments and also encompasses an embodiment obtained by combining or replacing configurations of the foregoing embodiments, as appropriate. In addition, it is also possible to change the combinations or processing procedures in the embodiments or to add modifications such as various design changes to the foregoing embodiments on the basis of the knowledge of a person skilled in the art, and an embodiment obtained by adding such modifications may also be encompassed by the scope of the present invention.

The rotary reflector 22 that includes the blades 22a is used in the foregoing embodiments. Alternatively, a polygon mirror, instead of the rotary reflector 22, may be used. Alternatively, a micro-electromechanical system (MEMS) mirror (resonance mirror), instead of the rotary reflector 22, may be used. Alternatively, instead of the rotary reflector 22, a digital micromirror device (DMD) in which a number of movable micromirrors are arrayed in a matrix may be used.

In the foregoing embodiments, a combination of a light source including a plurality of light emitting elements and an optical member including a plurality of first lenses has been described. Alternatively, a light source including one light emitting element and an optical member including one first lens may be combined. With this embodiment as well, the luminous region of the first lens can be expanded by the expanding lens portions 24c3, and thus the illumination region of the light distribution pattern can be expanded.

What is claimed is:

1. A lamp, comprising:
a light emitting element;
a lens for receiving light emitted from the light emitting element; and
a rotary reflector configured to rotate about an axis of rotation while reflecting light transmitted through the lens, wherein
the lens comprises an exit surface divided into a plurality of light controlling surfaces,
the exit surface includes
a first exit region in which a plurality of first light controlling surfaces of the plurality of light controlling surfaces are arrayed in a predetermined direction, and
a second exit region that is located side by side with the first exit region and in which a plurality of second light controlling surfaces of the plurality of light controlling surfaces are arrayed in the predetermined direction,
the lens is configured such that a border between adjacent two of the first light controlling surfaces and a border between adjacent two of the second light controlling surfaces are out of alignment in the predetermined direction, and
the rotary reflector is configured to reflect and scan a luminous pattern of the first exit region and the second exit region to form at least a part of a light distribution pattern.

2. The lamp according to claim 1, wherein
the rotary reflector is configured to scan the luminous pattern in a direction intersecting the predetermined direction in which the first light controlling surfaces and the second light controlling surfaces are arrayed.

3. The lamp according to claim 1, wherein
at least one of the plurality of light controlling surfaces is a third light controlling surface located in front of a light emitting surface of a corresponding light emitting element, and
the third light controlling surface is adjacent to both the first light controlling surfaces and the second light controlling surfaces.

4. The lamp according to claim 3, wherein
the first light controlling surfaces and the second light controlling surfaces are configured to expand a luminous region of the lens by directing light emitted diagonally from the light emitting surface to the lens and causing the light to exit toward a front.

* * * * *